United States Patent [19]

Suzuki et al.

[11] 4,368,181

[45] Jan. 11, 1983

[54] METHOD OF PRODUCING β-SILICON CARBIDE

[75] Inventors: Hiroshige Suzuki, 39-9, Kitasenzoku 2-chome, Ota-ku, Tokyo 145; Teizo Hase, Kawasaki, both of Japan

[73] Assignee: Hiroshige Suzuki, Tokyo, Japan

[21] Appl. No.: 293,218

[22] PCT Filed: Dec. 12, 1980

[86] PCT No.: PCT/JP80/00305
§ 371 Date: Aug. 5, 1981
§ 102(e) Date: Aug. 5, 1981

[87] PCT Pub. No.: WO81/01699
PCT Pub. Date: Jun. 25, 1981

[30] Foreign Application Priority Data

Dec. 14, 1979 [JP] Japan .............................. 54/161641

[51] Int. Cl.³ .............................................. C01B 31/36
[52] U.S. Cl. .................................................. 423/345
[58] Field of Search .................... 423/345, 346; 501/88

[56] References Cited

U.S. PATENT DOCUMENTS 3,368,871 2/1968 O'Connor et al. ............... 423/345
4,162,167 7/1979 Enomoto et al. ............... 423/345 X
4,226,841 10/1980 Komeya et al. .................. 423/345

FOREIGN PATENT DOCUMENTS 48-22920 7/1973 Japan.
54-136600 10/1979 Japan.

Primary Examiner—G. Peters
Attorney, Agent, or Firm—Stevens, Davis, Miller & Mosher

[57] ABSTRACT

A method of producing inexpensive β-silicon carbide at a relatively low temperature and in a high yield, wherein a raw material mixture consisting of carbonaceous powder having a particle size of not larger than 60 μm and silica powder having a particle size of not larger than 150 μm is continuously heated in a reaction system having a high temperature zone and a low temperature zone to form silicon monoxide in the reaction system together with SiC; the silicon monoxide is condensed at the low temperature zone to capture and is recovered in the reaction product; and the recovered product during the reaction or after the reaction is stirred, mixed and pulverized.

4 Claims, 1 Drawing Figure

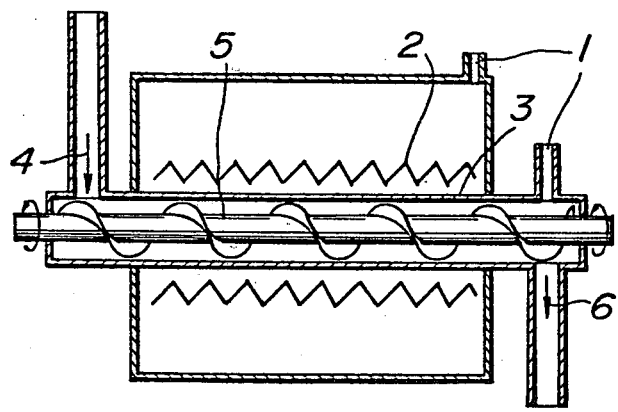

METHOD OF PRODUCING β-SILICON CARBIDE

TECHNICAL FIELD

The present invention relates to a method of producing β-silicon carbide at a temperature of not higher than 1,650° C., wherein carbonaceous powder having a particle size of not larger than 60 μm and silica powder having a particle size of not larger than 150 μm are used, and silicon monoxide, which is formed by a reaction of a mixture of carbon and silica (hereinafter, this mixture is merely referred to as "mixture"), is prevented from escaping from the reaction system, captured and further reacted with carbon.

BACKGROUND ART

Recently, β-silicon carbide has been widely used as filler and binder for refractory, deoxidizer in metallurgy, abrasive for polishing, pigment for high-temperature use and raw material for sintering due to its excellent chemical and physical properties over α-silicon carbide.

A method of producing β-silicon carbide is lately disclosed in Japanese Patent Laid Open Application No. 160,200/75 entitled as "Silicon carbide powder for sintering and a method of producing the same". In this method, β-silicon carbide is produced by a gaseous phase reaction by means of a particular apparatus. However, raw materials adapted to be used in the gaseous phase reaction are relatively expensive and easily hydrolyzed in air, and the yield of β-silicon carbide in the gaseous phase reaction is generally low, and hence the products are always expensive, and the production of β-silicon carbide by the gaseous phase reaction is disadvantageous.

Further, a method of producing β-silicon carbide inexpensively in a large scale is disclosed in Japanese Patent Laid Open Application No. 142,697/77 entitled as "Continuous method of producing β-silicon carbide". In this method, since raw material silica consisting of relatively large particles having an average particle size of 3–10 mm is used, the reaction rate is very low at a temperature of not higher than 1,650° C., and therefore a very high temperature of higher than the melting point (about 1,710° C.) of silica is required in the commercial production of β-silicon carbide. Moreover, in order to prevent sticking of raw material mixture by silicon monoxide formed during the reaction, unreacted silica and carbon must be intentionally left in the reaction product, and therefore the yield of β-silicon carbide is low and a superfluous operation must be carried out in order to remove these unreacted silica and carbon.

The present invention aims to obviate these drawbacks. That is, in the present invention, silica having a particle size of not larger than 150 μm is used in order to complete a major part of reaction at a relatively low temperature of not higher than 1,650° C., and further silicon monoxide formed during the reaction is prevented from escaping from the reaction system, and the captured silicon monoxide is again contacted with unreacted carbon at reaction temperature, whereby β-silicon carbide is produced in a sufficiently high efficiency.

DISCLOSURE OF THE INVENTION

The feature and effect of the present invention will be explained in more detail hereinafter.

A reaction for forming silicon carbide (SiC) from silica ($SiO_2$) and carbon (C) is generally shown by the following formula (1), and β-silicon carbide is formed within the temperature range defined in the present invention.

$$SiO_2 + 3C = \beta\text{-}SiC + 2CO \quad (1)$$

The reaction shown by the formula (1) proceeds through a process, wherein silica is firstly reacted with carbon to form silicon monoxide (SiO) through the reaction shown by the formula (2), and the silicon monoxide (SiO) is reacted with ambient carbon to form β-silicon carbide as shown by the formula (3). The fact that β-silicon carbide is mainly formed through a main reaction represented by the formulae (2) and (3) has been ascertained by the experiment of the inventors as well.

$$SiO_2 + C = SiO + CO \quad (2)$$

$$SiO + 2C = \beta\text{-}SiC + CO \quad (3)$$

A part of β-silicon carbide is formed through a side reaction represented by the formulae (4) and (5). In both cases, silicon monoxide has an important role in the production of β-silicon carbide.

$$2SiO = SiO_2 + Si \quad (4)$$

$$Si + C = \beta\text{-}SiC \quad (5)$$

In the reaction represented by the formulae (2) and (3), carbon monoxide (CO) is generated, and therefore the reaction proceeds easily by promoting the removal of carbon monoxide. Silicon monoxide formed together with carbon monoxide has a high vapor pressure and is apt to escape in the form of gas. However, since silicon monoxide is important as a silicon source, it is necessary that silicon monoxide is prevented from escaping and is fixed in the form of β-silicon carbide through the reaction represented by the formulae (3)–(5). However, in conventional methods, silicon monoxide does not always remain in the reaction product until these reactions are completed. As the results, about 1/6 time amount of silica escapes to leave a considerably large amount of unreacted carbon in the reaction product. Japanese Patent Laid Open Application No. 142,697/77 entitled as "Continuous method of producing β-silicon carbide" discloses a method, wherein an excess amount of carbon is used so as to prevent silicon monoxide from escaping and to fix it in the form of β-silicon carbide. However, in this method, the reaction product contains an increased excess amount of carbon, and the silicon carbide content in the reaction product is low as a whole.

In the reaction for forming β-silicon carbide through the formulae (3) and (5), β-silicon carbide formed covering the surface of carbon particle disturbs the subsequent contact of carbon particle with silicon monoxide or silicon, resulting in the failure in the fixing of silicon monoxide in the form of β-silicon carbide. Therefore, in order to produce effectively β-silicon carbide, it is necessary to adopt a means for preventing the escape of silicon monoxide from the reaction system and for contacting directly silicon monoxide with carbon.

Under these circumferences, in the present invention, carbonaceous powder having a particle size of not larger than 60 μm and fine silica powder having a particle size of not larger than 150 μm are used as raw materials so that β-silicon carbide can be produced at a temperature of not higher than 1,650° C.; a raw material mixture is continuously supplied into a reaction chamber to capture the resulting silicon monoxide in the reaction product and to prevent the escape of the silicon monoxide; and the reaction product containing the silicon monoxide captured therein is stirred, mixed and pulverized to continue the reaction of the captured silicon monoxide with carbon, whereby the reaction efficiency was effectively improved. That is, the present invention provides a method of producing very fine β-silicon carbide powder at a temperature remarkably lower than the temperature in conventional methods.

The present invention will be explained in more detail hereinafter.

It is necessary that the silica powder to be used as one of the raw materials of the present invention has a particle size of not larger than 150 μm. When the particle size is larger than 150 μm, silica is apt to remain in the product and therefore the use of such silica powder is disadvantageous in the operation. In the present invention, silica powder having a particle size of not larger than 80 μm is preferably used. The use of such fine silica powder can produce easily β-silicon carbide containing a very small amount of unreacted silica. When graphite powder is used as a carbon source, the graphite powder is pulverized into small particles during the reaction due to a very large amount of anisotropic volume increase accompanied with the formation of β-silicon carbide owing to a large anisotropy of graphite crystal structure, and therefore graphite powder having a particle size of not larger than 60 μm can be used. However, since such effect does not appear noticeably in the coke particles, which has not a sufficiently developed graphite crystal structure, it is necessary that fine coke particles having a particle size of not larger than 20 μm is used. Most preferable carbon source is carbon black, because in case of carbon black, reaction rate is rapid and it is advantageous in operation.

The reaction proceeds apparently according to the formula (1), and therefore the above described raw materials of carbon and silica are homogeneously mixed such that the resulting mixture has a molar ratio of $C/SiO_2$ of 3, and the mixture is reacted. When the molar ratio is noticeably deviated from 3, unreacted raw materials are contained in the resulting β-silicon carbide, and the quality of the β-silicon carbide is deteriorated. Therefore, the use of a raw material mixture having a molar ratio of $C/SiO_2$ deviated extremely from 3 is not preferable.

The present invention has a commercial merit that the operation can be carried out at a temperature of not higher than 1,650° C. As described above, carbon monoxide gas is generated during tthe reaction of the mixture of the above described raw materials, and therefore when the interior of the apparatus is kept under a reduced pressure to remove the carbon monoxide gas from the reaction system, the reaction can be advantageously proceeded. Accordingly, it is advantageous that the raw materials are reacted while keeping the reaction system vacuum by evacuation. When the reaction is carried out under vacuum, the reaction temperature can be decreased to as low as 1,200° C. When the reaction temperature is lower than 1,200° C., the reaction rate is too low to produce inexpensive β-silicon carbide. When the reaction is effected under an inert gas atmosphere, such as argon, helium or nitrogen gas, a sufficiently high reaction rate can be obtained within the temperature range of 1,450°-1,650° C., but the reaction rate is considerably decreased at a temperature lower than 1,450° C. A preferable temperature range is 1,400°-1,500° C. under vacuum, and is 1,500°-1,600° C. under an inert gas atmosphere, and in both cases finely divided β-silicon carbide having a uniform particle size and a high quality can be obtained. Since, the object of the present invention can be attained by a reaction temperature of not higher than 1,650° C., it is not advantageous to operate at a temperature of higher than 1,650° C. Further, according to the investigation by the inventors, the particles of β-silicon carbide have a very high surface diffusion coefficient at a temperature higher than 1,650° C., and therefore the particles of β-silicon carbide become coarse at a temperature higher than 1,650° C., and excessively high reaction temperature is not preferable.

As described above, it is an indispensable requirement in the present invention that silicon monoxide formed during the reaction of raw material mixture is prevented as possible from escaping from the substances, which are concerned in the reaction. In order to prevent the escape of silicon monoxide, it is necessary that gaseous silicon monoxide, which has not been reacted with carbon, is captured in the reaction product in a temperature zone, wherein silicon monoxide is condensed. This object can be attained by heating and reacting the mixture continuously. That is, the raw material mixture is continuously or intermittently supplied into a reaction tube, which has previously been heated up to such a temperature that the temperature distribution in the reaction tube consists of a low temperature zone, a high temperature zone and a low temperature zone, and the highest temperature lies within the temperature range defined in the present invention, and the reaction product is continuously or intermittently discharged from the reaction tube, whereby substantially all the silicon monoxide generated during the reaction can be captured. Silicon monoxide formed during the reaction step of the raw material mixture is present in a gaseous state, and when the reaction is carried out under vacuum, the gaseous silicon monoxide flows from the low temperature zone to the high temperature zone along the evacuating direction, and a fairly large amount of silicon monoxide is reacted with residual carbon in the high temperature zone, and unreacted silicon monoxide is again flowed into a low temperature zone and is condensed therein. When the reaction is carried out under an inert gas atmosphere, silicon monoxide exhibits the same behavior as that in vacuum along the flow of the atmosphere gas. Accordingly, the flowing direction of silicon monoxide can be adjusted by the direction of evacuation and by the direction of atmosphere gas flow. It is effective to move silicon monoxide towards the discharging direction of the reaction product. A concrete embodiment is shown by a method using a screw conveyer illustrated in the FIGURE. The interior of an apparatus is evacuated through evacuating openings 1, and a raw material mixture is continuously supplied into a reaction tube 3, the outer side of which is heated by means of a heating element 2, through a raw material-feed opening 4 by means of a screw conveyer 5. Gaseous silicon monoxide generated by the reaction of raw materials is moved from a low temperature zone to a high temperature zone and reacts with residual carbon therein to form β-silicon carbide. However, a part of silicon monoxide, which has not reacted with the residual carbon, is moved along the evacuating direction, condensed in a low temperature zone located in the extended portion of the high temperature zone, captured in the reaction product and recovered through a discharge opening 6 for reaction product.

During the raw material mixture is passing through the reaction tube, the mixture is stirred, mixed and pulverized by means of a screw conveyer while keeping the mixture within a temperature range, within which the reaction of $SiO_2+2C$ occurs predominantly; the resulting $\beta$-silicon carbide is separated from the surface of carbon particle; and the contact of the carbon particle with the silicon monoxide is continued, whereby the silicon monoxide can be fixed in the form of $\beta$-silicon carbide, and $\beta$-silicon carbide having a very high quality can be obtained in a higher reaction efficiency. However, when an operation is carried out in such a way that the generated silicon monoxide is not escaped without stirring, mixing and pulverizing at high temperature, the silicon monoxide can be completely recovered. Therefore, when the generated silicon monoxide and residual carbon are fully mixed in cold state and then continuously passed through a high temperature zone to react silicon monoxide with carbon, and this cycle is repeated, high quality $\beta$-silicon carbide can be obtained similarly to the case of high-temperature stirring. Since the resulting $\beta$-silicon carbide and silicon monoxide have not been sintered, they can be easily pulverized, and the above described operation can be carried out without difficulty.

BRIEF DESCRIPTION OF THE DRAWING

The FIGURE is a diagrammatical sectional view of the apparatus for carrying out the present invention.

BEST MODE OF CARRYING OUT THE INVENTION

The present invention will be explained in more detail hereinafter referring to examples and comparative examples.

EXAMPLE 1

An atmosphere-variable electric furnace was used, and a cylindrical graphite reaction tube provided in its interior with a screw conveyer was arranged in the inside of a heating element, and a mixture of carbon and silica (the molar ratio of $C/SiO_2=3$) having various particle sizes was supplied into the reaction tube and passed therethrough under a condition shown in the following Table 1.

When the reaction was carried out under vacuum, the reaction tube was evacuated towards the discharge opening of the reaction product, and when the reaction was carried out under argon atmosphere, argon gas was flowed from the feed opening of the raw material mixture towards the discharge opening of the reaction product. Whether the reaction tube was vertical type or horizontal type had not noticeable influence upon the composition of the reaction product. The obtained results are shown in the following Table 2. It can be seen from Table 2 that, when the reaction is effected by a method other than the present invention, the yield of $\beta$-SiC is less than 30% and is lower than the yield in the present invention. There was not a large difference in the composition of reaction product between a case wherein a raw material mixture was reacted in a powdery state, and a case wherein a raw material mixture was molded into a shaped article having a dimension of 2–5 mm together with about 5% of phenolic resin and the raw material mixture containing the resin was reacted in the form of the shaped article. The shaped article was able to prevent the scattering of powder and was able to be easily handled in all steps. The silica content was indicated by $SiO_x$ due to the presence of silicon monoxide contained therein.

TABLE 1

| | No. | Particle size of raw materials SiO₂ | C | Atmosphere | Reaction temperature (°C.) |
|---|---|---|---|---|---|
| Present invention | 1 | not larger than 40 μm | carbon black, the size being not larger than 0.3 μm | vacuum | 1,200 |
| | 2 | not larger than 40 μm | carbon black, the size being not larger than 0.3 μm | " | 1,350 |
| | 3 | not larger than 40 μm | carbon black, the size being not larger than 0.3 μm | " | 1,450 |
| | 4 | not larger than 40 μm | carbon black, the size being not larger than 0.3 μm | " | 1,600 |
| | 5 | not larger than 40 μm | carbon black, the size being not larger than 0.3 μm | " | 1,650 |
| | 6 | not larger than 80 μm | carbon black, the size being not larger than 0.3 μm | " | 1,450 |
| | 7 | not larger than 150 μm | carbon black, the size being not larger than 0.3 μm | " | 1,650 |
| | 8 | not larger than 40 μm | carbon black, the size being not larger than 0.3 μm | argon | 1,450 |
| | 9 | not larger than 80 μm | carbon black the size being not larger than 0.3 μm | " | 1,600 |
| | 10 | not larger than 80 μm | carbon black, the size being not larger than 0.3 μm | " | 1,650 |
| | 11 | not larger than 150 μm | carbon black, the size being not larger than 0.3 μm | " | 1,650 |
| | 12 | not larger than 80 μm | coke, the size being not larger than 20 μm | " | 1,600 |
| | 13 | not larger than 150 μm | coke, the size being not larger than 20 μm | vacuum | 1,650 |
| | 14 | not larger than 40 μm | graphite, the size being not larger than 60 μm | argon | 1,550 |
| | 15 | not larger than 80 μm | carbon black, the size being not larger than 0.3 μm | nitrogen | 1,600 |
| Outside the scope of the present invention | 16 | not larger than 10 μm | carbon black, the size being not larger than 0.3 μm | vacuum | 1,150 |
| | 17 | not larger than 10 μm | carbon black, the size being not larger than 0.3 μm | argon | 1,350 |
| | 18 | not larger than 10 μm | carbon black, the size being not larger than 0.3 μm | " | 1,400 |

EXAMPLE 2

The reaction product obtained in Example 1 was again mixed, pulverized in a ball mill, and was again passed through the reaction tube under the same heating condition as described in Example 1. This operation was repeated, and the number of repeated operations and the composition of the recovered reaction product are shown in Table 2 together with the results in Example 1, wherein the results of Example 2 were compared with those of Example 1. The quality of β-silicon carbide is remarkably improved, and the effect of the method of the present invention is clearly shown.

tion product of β-silicon carbide was remarkably improved. The following Table 3 shows the results of the experiments carried out under the same condition as that of sample Nos. 1–18 in Table 1 by using the above described apparatus. The obtained results are substantially the same as those obtained in Example 2. The resulting β-silicon carbide consisted mainly of particles having a size of 0.04–0.08 μm in the case of a reaction temperature of about 1,450° C., or having a size of 0.1–0.3 μm in the case of a reaction temperature of about 1,600° C., that is, consisted of very fine particles having high chemical and physical activities.

TABLE 2

| | No. | Example 1 Composition of reaction product (wt. %) | | | Example 2 Composition of reaction product (wt. %) | | | | | |
|---|---|---|---|---|---|---|---|---|---|---|
| | | | | | 2nd operation | | | 3rd operation | | |
| | | C | SiO$_x$ | β-SiC | C | SiO$_x$ | β-SiC | C | SiO$_x$ | β-SiC |
| Present invention | 1 | 22.3 | 37.2 | 40.5 | 13.3 | 22.1 | 64.6 | 4.7 | 7.8 | 87.5 |
| | 2 | 9.6 | 16.0 | 74.4 | 2.6 | 4.1 | 93.3 | 0.3 | 0.5 | 99.2 |
| | 3 | 5.8 | 9.6 | 84.6 | 1.0 | 1.5 | 97.5 | 0.3 | 0.5 | 99.2 |
| | 4 | 2.0 | 3.3 | 94.7 | 0.7 | 1.1 | 98.2 | 0.2 | 0.5 | 99.3 |
| | 5 | 1.4 | 2.3 | 96.3 | 0.5 | 0.8 | 98.7 | 0.2 | 0.5 | 99.3 |
| | 6 | 7.1 | 11.8 | 81.1 | 1.2 | 2.2 | 96.6 | 0.3 | 0.5 | 99.3 |
| | 7 | 9.3 | 15.5 | 75.2 | 1.5 | 2.6 | 95.9 | 0.4 | 0.8 | 98.8 |
| | 8 | 14.9 | 24.9 | 60.2 | 5.8 | 10.0 | 84.2 | 1.0 | 1.6 | 97.4 |
| | 9 | 12.7 | 21.2 | 66.1 | 3.5 | 6.2 | 90.3 | 0.6 | 1.0 | 98.4 |
| | 10 | 11.6 | 19.5 | 68.9 | 3.1 | 4.8 | 92.1 | 1.2 | 0.9 | 97.9 |
| | 11 | 12.9 | 21.3 | 65.8 | 3.8 | 6.1 | 90.1 | 0.6 | 1.1 | 98.3 |
| | 12 | 15.8 | 26.3 | 57.9 | 6.6 | 10.0 | 83.4 | 1.5 | 2.0 | 96.5 |
| | 13 | 24.5 | 40.8 | 34.7 | 13.8 | 20.6 | 65.6 | 7.2 | 11.4 | 81.5 |
| | 14 | 22.3 | 37.2 | 40.5 | 13.3 | 22.1 | 54.6 | 4.8 | 7.8 | 87.4 |
| | 15 | 12.0 | 20.1 | 67.9 | 4.0 | 6.6 | 89.4 | 0.6 | 1.1 | 98.3 |
| Outside the scope of the present invention | 16 | 30.1 | 50.2 | 19.7 | 24.3 | 40.3 | 35.4 | 15.8 | 26.2 | 42.2 |
| | 17 | 33.4 | 55.7 | 10.9 | 30.0 | 50.1 | 19.9 | 24.2 | 40.4 | 35.4 |
| | 18 | 26.3 | 43.8 | 29.9 | 19.2 | 31.6 | 48.8 | 10.1 | 16.2 | 73.7 |

EXAMPLE 3

Two silicon carbide discs having a large number of small holes having a diameter of about 3 mm were fitted in the inside of the reaction tube described in Example 1, one of which was placed at the highest temperature position and the other of which was placed at a location spaced apart from the highest temperature position on the raw material-feed opening side and having a temperature of about 100° C. lower than the highest temperature, such that the raw material mixture transported by the screw conveyer was passed through the small holes. The disc was provided at its feed opening side with a rotor having a working face made of the same material as that of the disc. The disc was further provided on its discharge opening side for reaction product with rollers made of the same material as that of the disc in close contact therewith in order to mill the reaction product passed through the small holes. The raw material mixture was transported in the reaction tube by the screw conveyer, and during the transportation the mixture was subjected to mixing and pulverizing operations by means of the disc assembly, and the quality of the reac-

TABLE 3

| | No. | Composition of reaction product (wt. %) | | |
|---|---|---|---|---|
| | | C | SiO$_x$ | β-SiC |
| Present invention | 1 | 13.0 | 22.1 | 64.9 |
| | 2 | 2.4 | 4.0 | 93.6 |
| | 3 | 1.0 | 1.5 | 97.5 |
| | 4 | 0.9 | 1.5 | 97.6 |
| | 5 | 0.7 | 1.1 | 98.2 |
| | 6 | 1.5 | 2.5 | 96.0 |
| | 7 | 1.6 | 2.8 | 95.6 |
| | 8 | 8.2 | 13.7 | 78.1 |
| | 9 | 5.1 | 8.5 | 86.4 |
| | 10 | 3.5 | 5.5 | 91.0 |
| | 11 | 4.4 | 7.3 | 88.3 |
| | 12 | 8.4 | 14.1 | 77.5 |
| | 13 | 16.2 | 27.0 | 56.8 |
| | 14 | 13.5 | 23.6 | 62.9 |
| | 15 | 6.8 | 12.7 | 80.5 |
| Outside the scope of the present invention | 16 | 29.9 | 49.3 | 20.8 |
| | 17 | 32.8 | 54.6 | 12.4 |
| | 18 | 26.0 | 42.7 | 31.3 |

EXAMPLE 4

Raw materials having the particle size described in Example 1 were mixed with 2–5% of liquid phenolic resin as a molding agents, and the resulting mixture was formed into granules having a dimension of 2–5 mm. Even when pitch was used as a molding agent, there was substantially no difference in the test result between the liquid phenolic resin and the pitch. In both cases, the carbonization rate of these molding agents was previously measured, and the raw materials and the molding agent were mixed so as to form a raw material mixture having a molar ratio of $C/SiO_2$ of 3. The granules were charged in graphite crucibles provided at their bottom with a large number of holes having a diameter of about 1 mm, and the crucibles were successively piled up and were moved upwardly from the lower portion of a vertical type reaction tube. When one crucible was charged into the reaction tube at the lower portion, the uppermost one crucible was discharged from the reaction tube, whereby the raw material mixture was continuously reacted. In the piling up crucibles, the bottom portion and the side wall of the top portion of crucibles were tapered, and the crucibles were piled up so as to fit the tapered bottom portion of one crucible into the tapered side wall of the top of another crucible piled up just above. In the continuous operation, a crucible, from which silicon monoxide had escaped in the high temperature zone, was exposed to the silicon monoxide vapor escaped from the high temperature zone, and the silicon monoxide was able to be precipitated and captured, when the crucible was moved to the low temperature zone. Therefore, the silicon source was able to be preserved similarly to the case of Examples 1 and 2. This fact was proved from the fact that, when such a cycle was repeated that the raw material mixture in a crucible was once heat treated at high temperature, the reaction product was pulverized and mixed by means of a roller mill, ball mill or the like, and the pulverized mixture was again heated and reacted, $\beta$-silicon carbide having a high quality was able to be obtained. The results of the tests were substantially the same as those in Example 2.

INDUSTRIAL APPLICABILITY

The $\beta$-silicon carbide produced by the method of the present invention is widely used as filler and binder for refractory, deoxidizer in metallurgy, abrasive for polishing, pigment for high-temperature use, and raw material for sintering.

We claim:

1. A method of producing $\beta$-silicon carbide, comprising mixing carbonaceous powder having a particle size of not larger than 60 $\mu$m with silica powder having a particle size of not larger than 150 $\mu$m in a mixing ratio of the molar ratio of carbon to silica of 3 to produce a raw materiial mixture; heating continuously the raw material mixture in a reaction system having a high temperature zone and a low temperature zone such that the raw material mixture is heated at a low temperature and then at a high temperature in the first half of the reaction and then at a low temperature in the second half of the reaction in this order; condensing silicon monoxide, which is formed together with SiC in the reaction system, in the low temperature zones in the first and second halves in the reaction system to capture and recover the silicon monoxide in the reaction product without escaping of the silicon monoxide from the reaction system; stirring, mixing and pulverizing the recovered product during the reaction or after the reaction to contact again unreacted carbon and silica with the above recovered silicon monoxide and to react them; and repeating the above described operation until the reaction is substantially completed.

2. A method of producing $\beta$-silicon carbide according to claim 1, wherein the raw material mixture is continuously heated under vacuum at a temperature of the high temperature zone of 1,200°–1,650° C.

3. A method of producing $\beta$-silicon carbide according to claim 1, wherein the raw material mixture is continuously heated under an inert gas atmosphere at a temperature of the high temperature zone of 1,450°–1,650° C.

4. A method of producing $\beta$-silicon carbide according to claim 1, wherein the raw material mixture is continuously heated while transporting it by means of a screw conveyer.

* * * * *